US008096085B2

(12) United States Patent
Schneider et al.

(10) Patent No.: US 8,096,085 B2
(45) Date of Patent: Jan. 17, 2012

(54) CONNECTION NODE FOR A THREE-DIMENSIONAL FRAMEWORK, IN PARTICULAR FOR A GEODESIC STRUCTURE

(76) Inventors: Michael Schneider, Berlin (DE); Carsten Fulland, Berlin (DE); Gordian Overschmidt, Berlin (DE)

( * ) Notice: Subject to any disclaimer, the term of this patent is extended or adjusted under 35 U.S.C. 154(b) by 803 days.

(21) Appl. No.: 12/093,484

(22) PCT Filed: Apr. 25, 2006

(86) PCT No.: PCT/EP2006/004408
§ 371 (c)(1),
(2), (4) Date: Sep. 5, 2008

(87) PCT Pub. No.: WO2007/054136
PCT Pub. Date: May 18, 2007

(65) Prior Publication Data
US 2011/0167738 A1    Jul. 14, 2011

(30) Foreign Application Priority Data

Nov. 14, 2005  (DE) ............... 20 2005 017 822 U

(51) Int. Cl.
*E04B 1/32* (2006.01)
*E04H 12/00* (2006.01)
*F16B 7/04* (2006.01)
(52) U.S. Cl. ......... 52/81.3; 52/655.1; 52/646; 52/656.9; 403/170; 403/218
(58) Field of Classification Search .............. 52/81.1, 52/81.2, 81.3, 91.4, 81.5, 81.6, 655.1, 653.1, 52/646, 656.9; 403/169–171, 176, 217–219
See application file for complete search history.

(56) References Cited

U.S. PATENT DOCUMENTS

| | | | | |
|---|---|---|---|---|
| 2,682,235 A * | 6/1954 | Fuller | ............... | 52/81.3 |
| 3,632,147 A * | 1/1972 | Finger | ............... | 403/171 |
| 3,766,932 A * | 10/1973 | Sidis et al. | ............... | 135/147 |
| 4,099,888 A | 7/1978 | Simone | | |
| 4,296,585 A * | 10/1981 | Bini | ............... | 52/745.08 |

(Continued)

FOREIGN PATENT DOCUMENTS
DE          2110157         11/1971
(Continued)

*Primary Examiner* — Brian Glessner
*Assistant Examiner* — Beth Stephan
(74) *Attorney, Agent, or Firm* — Norris, McLaughlin & Marcus, P.A.

(57) ABSTRACT

The invention relates to a connecting node (10, 20) for constructing a three-dimensional framework (100), in particular a geodetic structure, wherein the connecting node (10, 20) has at least one connecting arrangement for connection by way of a definable number of (n) of basic structural elements (3) attached to the respective connecting node (10, 20) with other identical connecting nodes (10, 20). It is provided that the connecting node (10, 20) is formed as a disk (4, 6) having a predefinable number (n) of keyholes ($1_n$), with each of the keyholes ($1_n$) being penetrated by a connecting means (5) and engaging with a receiving element (3A) attached on the basic structural elements ($3_n$), so that each basic structural element ($3_n$) is rotatably supported in the formed first connecting arrangement (5, 3A) and can be pre-adjusted and subsequently attached at arbitrary predefinable angles. The invention is also directed to a three-dimensional framework (100), in particular a geodetic structure, with a plurality of configurable basic structural element ($3_n$), which are secured between the connecting nodes (10, 20) so as to form the three-dimensional framework.

10 Claims, 2 Drawing Sheets

U.S. PATENT DOCUMENTS

| | | | | |
|---|---|---|---|---|
| 4,438,615 | A | * | 3/1984 | Wendel .................. 52/655.2 |
| 4,627,210 | A | * | 12/1986 | Beaulieu .................. 52/646 |
| 4,677,804 | A | * | 7/1987 | Holt .................. 52/653.2 |
| 4,951,440 | A | * | 8/1990 | Staeger .................. 52/646 |
| 4,953,329 | A | * | 9/1990 | Frantl .................. 52/80.1 |
| 4,982,546 | A | * | 1/1991 | Lange .................. 52/655.1 |
| 5,165,207 | A | * | 11/1992 | Oehlke .................. 52/81.3 |
| 5,328,286 | A | * | 7/1994 | Lee .................. 403/218 |
| 5,797,695 | A | * | 8/1998 | Prusmack .................. 403/170 |

FOREIGN PATENT DOCUMENTS

GB        2022647        12/1979

* cited by examiner

CONNECTION NODE FOR A THREE-DIMENSIONAL FRAMEWORK, IN PARTICULAR FOR A GEODESIC STRUCTURE This application is a 371 application of PCT/EP2006/004408 filed Apr. 25, 2006, which claims priority to the German application DE 20 2005 017 822.5 filed Nov. 14, 2005.

The invention relates to a connecting node and a three-dimensional framework, in particular for a geodetic structure.

A number of documents are known from the patent literature which are directed to the construction of three-dimensional frameworks or framework buildings.

Framework solutions are disclosed, for example, in DE 101 15 815 B4, DE 37 15 228 C2 and DE 28 00 720.

Three-dimensional frameworks are summarized typically under the generic term of shell-type frameworks or frameworks with active shapes.

If the surface of these frameworks is broken down into rods, then the term lattice shell is typically used, if they are under compression, or conversely rope networks, if they are under tension.

Two different possibilities have emerged for stabilizing these systems. On one hand, shells may have rectangular areas with identical mesh size, or with an even a number of the delimiting rods.

Although almost any geometric form can be realized with these constructions, they are disadvantageous because polygons with an even number of sides cannot provide a stabilizing effect. Therefore, in such constructions, the polygons are stabilized with two-dimensional stiffening elements, or the angles of the rods are secured relative to one another by suitable node elements. With the latter approach, moment forces are generated in the rods. For this reason, the shell walls must be anchored in the ground with a tight tensile connection in order to absorb the generated horizontal forces. These can advantageously be assembled from rods of identical length. A deformation into a curved surface occurs typically by transforming the square mesh into a system of rhombuses, whereby either the rods must bend or the nodes are formed by articulated joints which are subsequently secured in place. For example, the document DE 41 01 276 C2 is directed to such structure.

In a fundamentally different method for producing spatially curved support shells, the curved support shells are assembled from triangular surfaces, whereby the triangles necessarily form planar, unmovable surfaces. If such frameworks are assembled from rods, then the rods can also be connected in an articulated manner. This can eliminate moment forces in the rods.

Possible domes formed of triangular surfaces are, for example, frame, spline, lamellar, grid, Schwedler domes or geodetic domes.

Geodetic domes are known, in particular, from U.S. Pat. No. 2,682,235, DE 22 32 114 B2, DE 40 26 527 A1, DE 30 35 698 and U.S. Pat. No. 5,628,154.

The construction systems of conventional geodetic domes have in common that they are formed of straight and/or curved rods which merge at node points in a suitable manner.

Such systems economize the processes required for constructing architectural shapes. They simplify both planning and handling as well as then actual construction and can be reconfigured, i.e. reused. Unlike individualized construction by craftsmen, these systems have many additional practical and/or aesthetic advantages. The construction systems of the aforedescribed type consist of a limited number of matched system components which can be used to construct a large variety of different structures, such as for example two-dimensional arrangements for dividing rooms or spatial, one- or multi-dimensional structures, such as buildings, for different purposes. A certain number of components hereby represents a corresponding system, wherein the system content is greater if the number of different system components is less, i.e. the smaller the overall number of components, and the more possibilities for constructing different structures exist (variability). The most important requirements to the systems of the aforedescribed type are: simple assembly of the system, logical sequential order of the components during assembly, high stability, low weight, small volume, aesthetic appearance and functionality.

The present invention intends to also satisfy these requirements with its novel simple constructive solution.

It is therefore an object of the invention to provide a system of the aforedescribed type which has a minimal number of different components and can therefore be constructed with a minimum number of components, which offers simple and fast assembly without requiring a lot of thought for determining in which sequential order the parts have to be assembled; which has a high resistance to wear, a low weight and a small volume. The construction system should make it possible to construct a large variety of different structures, should have an aesthetic form and provide improved stability of the two-dimensional or three-dimensional geodetic frameworks constructed as a framework structure.

This object is attained by the invention in that for constructing a three-dimensional framework, in particular a geodetic structure, the connecting node is formed as a disk having a predefinable number of keyholes, with each of the keyholes being penetrated by a connecting means and engaging with a receiving element attached on the basic structural elements, so that each basic structural element is rotatably supported in the formed first connecting arrangement and can be pre-adjusted and subsequently attached at arbitrary predefinable angles.

With the connecting node according to the invention, a three-dimensional framework can be constructed, wherein a majority of configurable basic structural elements is attached between the connecting nodes of the invention.

In a preferred embodiment of the invention, the disk is, on one hand, implemented as a base disk which forms a connecting node near the ground. This base disk preferably forms the first connecting node on the ground or on the base of the three-dimensional framework.

In another preferred embodiment of the invention, the disk is arranged on a base plate by way of height adjustment elements for adjusting the connecting node relative to ground.

The other connecting nodes located above are, on the other hand, implemented as disks, wherein these connecting nodes have no specific shape for supporting the framework on the ground.

In a preferred embodiment of the invention, the disk that is not implemented as a base disk includes a safety clip with a safety clip opening which can be arranged at a fixed predeterminable position on the disk on at least one keyhole on the side of the disk facing the basic structural element between the disk and the basic structural element, wherein the safety clip holds, attaches the basic structural element non-rotatably on the disk by a second connecting arrangement formed in this way, thereby absorbing the torque of the disk in the basic structural element.

The second connecting arrangement corresponds here to the first connecting arrangement, wherein the connecting means extends in this case not only through a keyhole of a disk, but is also guided through the safety clip opening before engaging with the receiving element of the basic structural element.

The disk includes fastening openings disposed on at least one keyhole, with fastening openings cooperating with fastening projections of the safety clip which can be inserted into the fastening openings, for arranging the safety clip in the fixed predefinable position on the disk.

The safety clip also includes bent sections oriented towards the basic structural element and forming a receiving shoe for holding the basic structural element in the safety clip.

In addition, the basic structural element has flattened end regions having a height and width adapted to cooperate with the receiving shoe, if a safety clip is used.

According to a preferred embodiment of the invention, for both disks—base disk or disk in the upper region of a three-dimensional framework, the keyholes of the disks form openings of a type that has a slotted outlet and has in the region of the outlet a depression with a predefined depth cooperating with the head of the connecting means, to facilitate with the slotted outlet guiding to the desired attachment location of the connecting means and to prevent with the depression the connecting means, which at least pre-adjusts and pre-tightens the basic structural element, from slipping out.

Preferably, the basic structural element has the flattened end regions and the first and second connecting arrangement is as a connecting means embodied as a threaded bolt or the like, in particular a self-locking screw, which cooperates with the safety clip opening and the receiving element, which is preferably configured as rivet nut that is fixedly disposed on the basic structural element on the side facing away from the disk.

The disks and the associated connecting arrangements for mounting the basic structural elements provide simple design, and easy assembly and disassembly of the three-dimensional framework with a limited number of essentially standardized components.

In a preferred embodiment of the invention, the basic structural elements between the connecting nodes form triangular meshes, the size of which depends on the predefinable length and the angular position of the basic structural elements.

Finally, the three-dimensional framework can be covered with a cover, in particular a cover made of a translucent fabric, which can be attached to the connecting nodes and/or the basic structural element in a suitable manner.

Additional preferred embodiment of the invention are recited as additional features in the dependent claims.

Exemplary embodiments of the invention will now be described with reference to the appended drawings.

Figure 1:
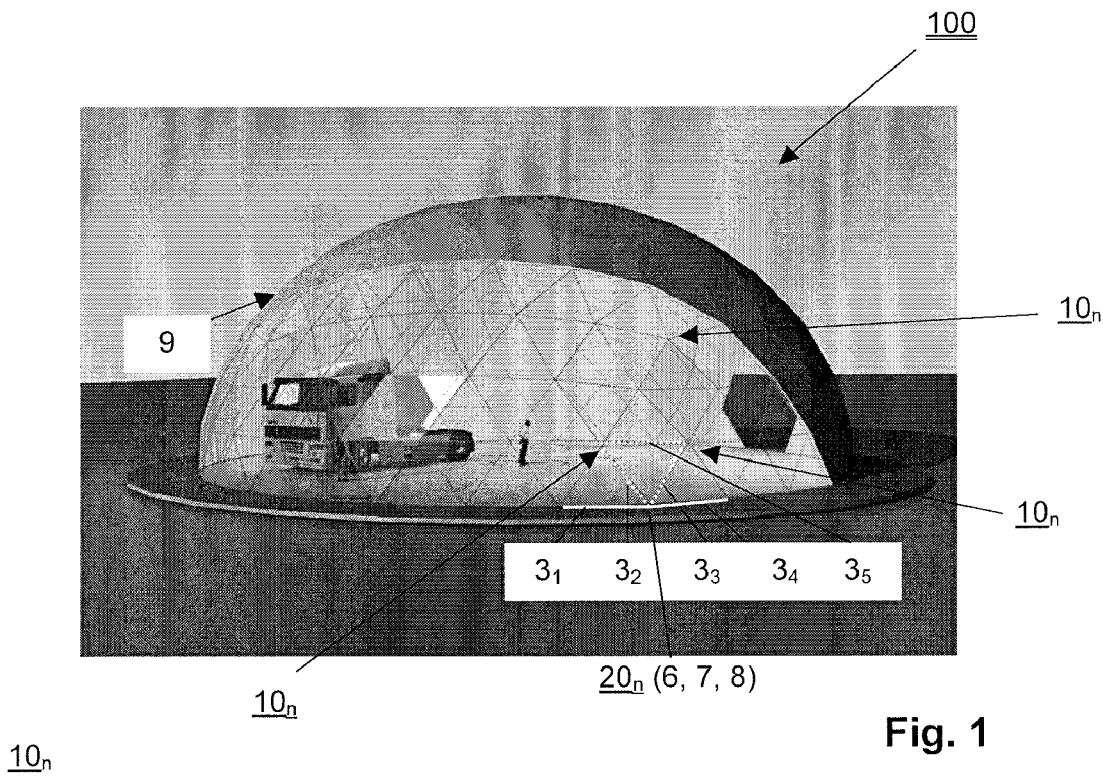
FIG. 1 shows a perspective view of a three-dimensional framework with a geodetic structure.

FIG. 1 shows an exemplary three-dimensional framework 100 configured as a geodetic structure. For constructing such a geodetic structure, basic structural elements 3 are used, of which a predefined number n is connected with one another at connecting nodes 10, 20. Several basic structural elements $3_n$ are highlighted as examples and referred to with the symbols $3_1$, $3_2$, $3_3$, $3_4$, $3_5$. The basic structural elements $3_2$, $3_3$, $3_5$ shown as dashed lines represent here a triangular mesh which is used as a basic structure in the construction of the three-dimensional framework 100. A three-dimensional framework 100 can be configured only from connecting nodes $10_n$. The three-dimensional framework can also be configured with connecting nodes specifically configured as a connecting base nodes $20_n$ located in the base region/ground region of the three-dimensional framework 100, whereas the connecting base nodes $10_n$ which are not located in the base region or ground region are configured identically for the region of the three-dimensional framework 100 located above.

Basically, each connecting node $10_n$, $20_n$—i.e., both the connecting node 10 in the upper region and also the connecting node 20 in the base region—has a disk with a predeterminable number n of keyholes $1_n$.

Figure 2:
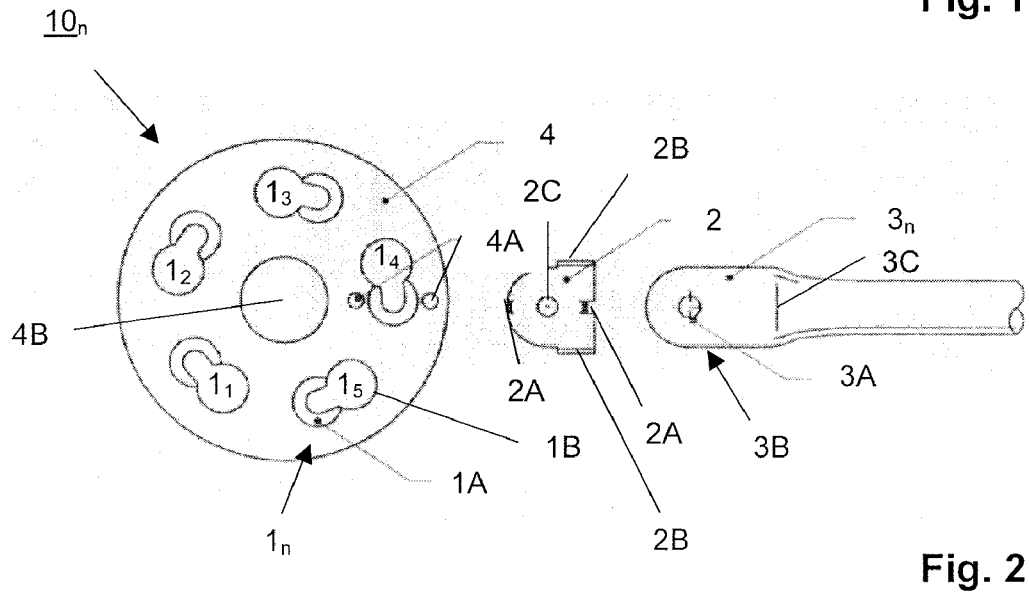
FIG. 2 shows in a top view the essential components of a connecting node with an exemplarily arranged basic structural element in the arrangement which include a safety clip.

Such disk 4 is shown in FIG. 2 in a top view. In the exemplary embodiment of FIG. 2, the disk 4 has, for example, five keyholes $1_1$ to $1_5$ which are labeled in a clockwise direction.

The corresponding keyhole $1_n$ has an opening 1B, which transitions into a slotted outlet, which has a depression 1A on the side facing the observer in the view of FIG. 2.

The disk 4 has also an interior disk opening, which however is not absolutely necessary; it is used, however, to reduce the weight and to facilitate handling of the disk 4. A disk 4 therefore represents a basic element for each connecting node $10_n$, $20_n$, wherein the respective keyholes $1_n$ operate to secure the basic structural elements $3_n$ via a first connecting arrangement 5, 3A.

The basic structural element $3_n$ used in the exemplary embodiment is, for example, a connecting rod which can be screwed and hence attached to the disk 4 with the first connecting arrangement 5, 3A of a screw connection. A screw or a bold 5 representing a connecting means is guided through the keyhole $1_n$, through which a connecting rod $3_n$ extends, and is attached to the disk 4 with an opposing nut 3A representing a receiving element.

Figure 3A:
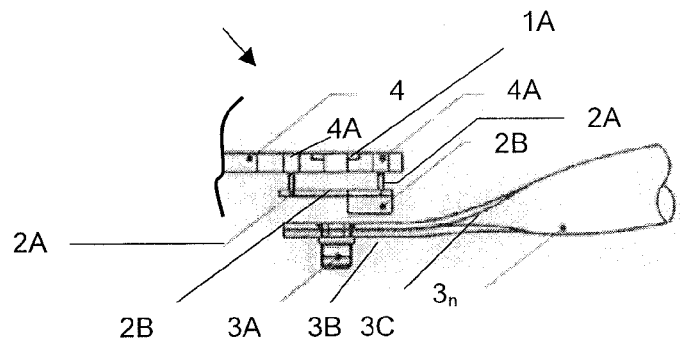
FIG. 3A is a side view according to FIG. 2 shortly before installation of the exemplary basic structural element on a connecting node.

As shown in FIG. 2 in conjunction with FIG. 3A, this nut 3A can be replaced with a rivet nut which has an interior thread and is already mounted on the connecting rod $3_n$, so that the connecting means 5, the threaded bolt or the screw with the corresponding exterior thread can easily project through the keyhole 1, thus establishing the screw connection without co-rotation of the receiving element 3A.

With the special construction of the keyhole $1_n$, the connecting element 5 can also be slidably inserted through the keyhole into the slotted outlet of the keyhole $1_n$ and pre-adjusted through a slight rotation of the connecting means via the corresponding screw or bolt head in the depression 1A of the respective keyhole $1_n$. After pre-adjustment, the connecting means 5 can no longer be redirected into the opening 1B, because the head of the respective connecting means is held in the depression 1A.

A three-dimensional framework 100 can basically be constructed from a disk 4 and a basic structural element 3 and a connecting arrangement 5, 3A, whereby the installation of geodetic structures in particular is difficult, because the respective angles between the disk 4 and the basic structural elements 3 are different and are determined only during assembly, so that a complete attachment of the respective connecting arrangements the rule 5, 3A would have the result that these connections would have to be loosened again and affixed again and then retightened.

However, to be able to pre-assemble and pre-adjust the three-dimensional framework 100 initially in a sufficiently stable state and to be able to set all angles formed between the basic structural elements $3_n$, a quasi pre-adjusted structure is formed in which, however, according to the invention, the disk 4 is prevented from rotating relative to the basic structural element $3_n$ in the pre-adjusted, but not yet completely tightened state, when the first connecting arrangement 5, 3A and the first basic structural element $3_n$ are attached.

Figure 3B:
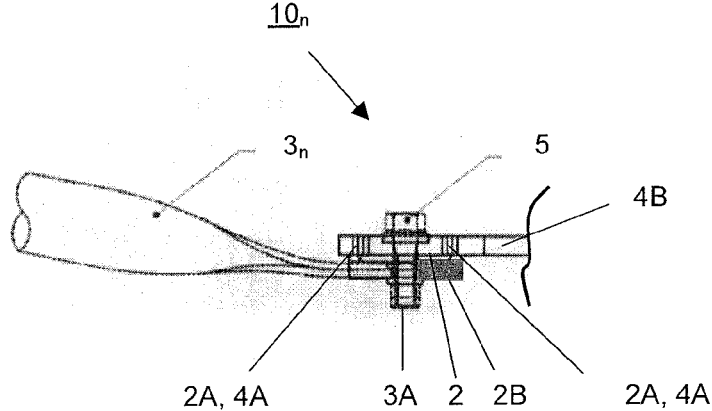
FIG. 3B is a side view according to FIGS. 2 and 3A shortly after installation of the exemplary basic structural element on a connecting node.

To this end, as shown in FIGS. 2, 3A and 3B, a safety clip 2 can be arranged between the disks 4 and the basic structural element $3_n$, which prevents rotation of the disk 4 relative to the basic structural element 3, thus permitting pre-adjustment of all basic structural element $3_n$.

In the top view of FIG. 2, the safety clip 2 is shown in detail, which includes a safety clip opening 2C allowing the connecting means 5 to extend through the safety clip. The safety clip 2 also has attachment projections 2A facing the disk 4 and configured for engagement in the attachment openings 4A of the disk 4. The safety clip 2 also forms a receiving shoe 2B which is formed as bent holding plates, wherein the receiving shoe 2B faces the basic structural element $3_n$ and cooperates with the basic structure of the basic structural element $3_n$.

FIG. 3A shows a side view of a connection of a second connecting arrangement 5, 2C, 3A produced with a different arrangement of the safety clip 2 shortly before assembly. The safety clip 2 is mounted, for example, on a keyhole $1_4$ (FIG. 2) wherein the attachment projections 2A engage in the attachment openings 4A and the receiving shoe 2B engages on both sides of a basic structural element $3_n$, so that after insertion of a connecting means 5 (not shown in FIG. 3A) and after the connecting means 5 has been screwed together with the receiving element 3A, the basic structural element 3 is no longer able to rotate relative to the disk 4. The torque acting on the disk 4 during the attachment of additional basic structural elements $3_n$ is absorbed by the safety clip 2 and transmitted via the basic structural element $3_n$ into the overall structure, i.e., the three-dimensional framework 100 (FIG. 1), as shown in FIGS. 3A and 3B.

To construct, for example, a geodetic structure according to FIG. 1, the basic structural element $3_n$, i.e., the connecting rods, are curved in the region 3C and form preferably flattened end regions 3B, which can be easily supported by the receiving shoe 2B of the safety clip 2.

Figures 4A, 4B:
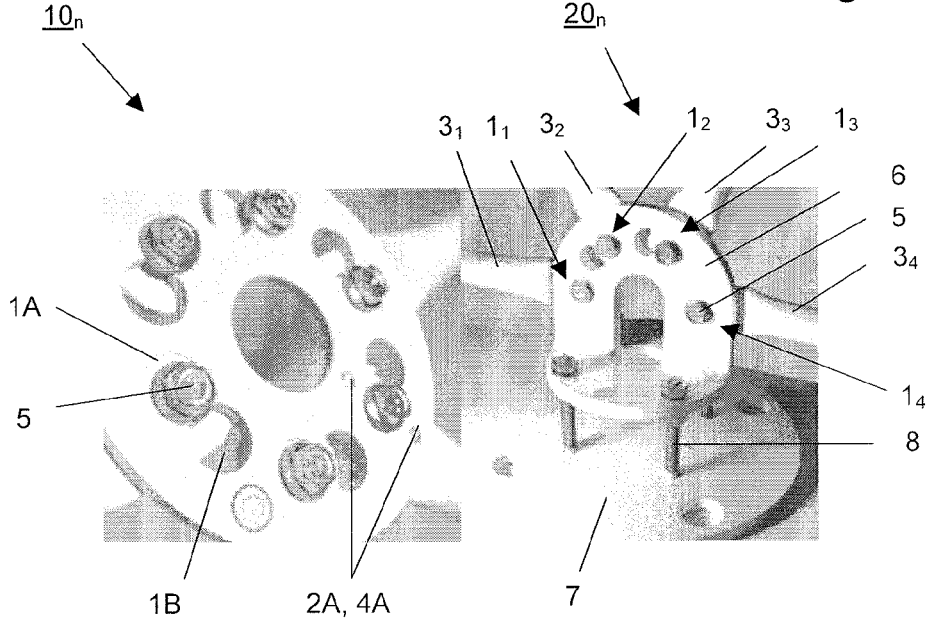
FIG. 4A is a perspective interior view onto a connecting node, according to FIGS. 2 to 3B, with basic structural elements arranged on a disk and a basic structural element provided with a safety clip.
FIG. 4B is a perspective interior view onto a connecting node with basic structural elements arranged on a base disk.

FIGS. 4A and 4B show once more for illustration interior views of the connecting node 10, 20, wherein FIG. 4A represents a region specifically configured as a connecting base node 20.

FIG. 4A shows an interior view of a connecting node with six keyholes $1_n$, wherein one keyhole $1_n$ shows again the corresponding attachment openings 4A, with a mounted safety clip 2 engaging with its attachment projections 2A from the outside to the inside. The connecting means 5 is inserted into the receiving element 3A from the inside to the outside and screwed together.

FIG. 4B shows the specially configured connecting base node $20_n$, which is illustrated with the same reference numerals as those in the example of FIG. 1. The connecting base node $20_n$ is mounted on a base plate 7 with height adjustment elements, preferably threaded bolts 8, so that the height of the disk 6 configured as an inverted "U" can be adjusted relative to the base plate 7.

The U-shaped disk 6 can also be implemented as a complete disk 4, so that the U-shaped configuration is only one of many possible modifications. Because the connecting base node $20_n$ is already prevented from rotating relative to the ground, there is no need for a safety clip 2, so that only keyholes $1_n$ with outwardly extending basic structural element $3_n$ are formed in the connecting base node $20_n$, without requiring a safety clip 2. The slotted exits of the openings 1B of the keyhole openings $1_1$ and $1_4$ can also be eliminated, because associated basic structural elements $3_1$ and $3_4$ in the base region can be securely screwed together already during assembly and used without play.

The geodetic structure or a three-dimensional framework 100 is preferably installed with a triangular mesh, wherein the basic structural element $3_2$ and $3_3$ illustrated, for example, in FIG. 4B are arranged on a non-rotatable disk 6. Each of the opposing ends of the basic structural element $3_2$ and $3_3$ is provided with a disk 4, at which location the second connecting arrangement 5, 2C, 3A is implemented, with a safety clip 2 arranged between the disk 4 and the basic structural element $3_2$ and $3_3$. The disks 4 arranged in this manner are prevented from rotating, and an additional installation with basic structural element $3_n$ by forming a triangular mesh for constructing the desired three-dimensional framework with the desired attainable stability can be easily accomplished. According to the invention, the angles can be pre-adjusted to any value and the installation is completed by tightening the corresponding screw connection 5, 3A after a three-dimensional framework has been partially or completely constructed.

The angles at the connecting nodes $10_n$, $20_n$ which vary during construction of the three-dimensional framework 100 can hence be easily assembled and dismantled without requiring a prior computationally complex determination of the angles.

Finally, the three-dimensional framework 100 can be provided with a corresponding cover 9 which can be attached at the connecting nodes $10_n$, $20_n$ and/or the basic structural element $3_n$. The cover 9 can be attached with tensioning elements, either from the inside or outside, or both, as illustrated in FIG. 1.

LIST OF REFERENCE SYMBOLS $1_n$ keyhole
1A depression
1B opening/hole
2 safety clip
2A attachment projections
2B receiving shoe
2C safety clip opening
$3_n$ basic structural element [connecting rod]
3A receiving element [rivet nut/interior thread]
3B flattened end regions
3C curvature
4 disk
4A attachment opening
4B interior disk opening
5 connecting means [threaded bolt/screw-exterior thread]
6 disk
7 baseplate
8 height adjustment elements [threaded bolt]
9 cover
10 connecting node
20 connecting base node
100 geodetic structure
5, 3A first connecting arrangement
5, 2C, 3A second connecting arrangement
index n number

The invention claimed is:

1. Connecting node for constructing a three-dimensional framework, wherein the connecting node comprises at least one connecting arrangement for connection with other identical connecting nodes by way of a definable number of basic structural elements engaging with the respective connecting node, wherein the connecting node is configured as a disk having a predefinable number of keyholes, with each of the keyholes being penetrated by a corresponding connecting means and engaging with a receiving element attached on the basic structural elements, such that each basic structural element is rotatably supported in a formed first connecting arrangement and configured to be pre-adjusted and subsequently attached at arbitrary predefinable angles, wherein, on at least one keyhole on a side of the disk facing the basic structural element between the disk and the basic structural element, there is arranged a safety clip with a safety clip opening at a fixed predeterminable position on the disk, wherein the safety clip attaches the basic structural element non-rotatably on the disk by way of a second connecting arrangement, thereby absorbing the torque of the disk in the basic structural element.

2. Connecting node according to claim 1, wherein the disk comprises, on at least one keyhole, at least one fastening opening configured to cooperate with fastening projections of the safety clip which can be inserted into the fastening openings, for arranging the safety clip in the fixed predefinable position on the disk.

3. Connecting node according to claim 1, wherein the safety clip comprises bent sections oriented towards the basic structural element and forming a receiving shoe for holding the basic structural element in the safety clip.

4. Connecting node according to claim 1, wherein the keyholes form an opening, which has a slotted outlet and, in a region of the outlet, a depression cooperating with the connecting means, to facilitate guiding and attaching the connecting means and to prevent, with the depression, the connecting means, which at least pre-adjusts and pre-tightens the basic structural element, from slipping out.

5. Connecting node according to claim 1, wherein the basic structural element has flattened end regions which cooperate with the receiving shoe, if a safety clip according to claim 2 is placed.

6. Connecting node according to claim 1, wherein the first connecting arrangement is as a connecting means embodied as a threaded bolt, configured to cooperate with the receiving element, which is preferably formed as a rivet nut that is fixedly disposed on the basic structural element on the side facing away from the disk.

7. Connecting node according to claim 1, wherein the disk is arranged on a base plate by way of height adjustment elements for adjusting the connecting node relative to ground.

8. Three-dimensional framework comprising a plurality of configurable basic structural element, which are secured between the connecting nodes as set forth in claim 1.

9. Three-dimensional framework according to claim 8, wherein the basic structural elements between the connecting nodes form triangular meshes, the size of which depends on the predefinable length and the angular position of the basic structural elements.

10. Three-dimensional framework according to claim 8, wherein the three-dimensional framework can be covered with a cover configured to be attached to the connecting nodes and/or the basic structural element on the inside and/or on the outside.

* * * * *